Dec. 8, 1931.   J. E. SCHRODER   1,835,814
APPARATUS FOR DISTRIBUTING GLASSWARE
Filed May 31, 1928   2 Sheets-Sheet 1

Witness.
Winslow B. Thayer

Inventor:
John E. Schroder.
by Robson D Brown
Attorney

Dec. 8, 1931.   J. E. SCHRODER   1,835,814
APPARATUS FOR DISTRIBUTING GLASSWARE
Filed May 31, 1928   2 Sheets-Sheet 2
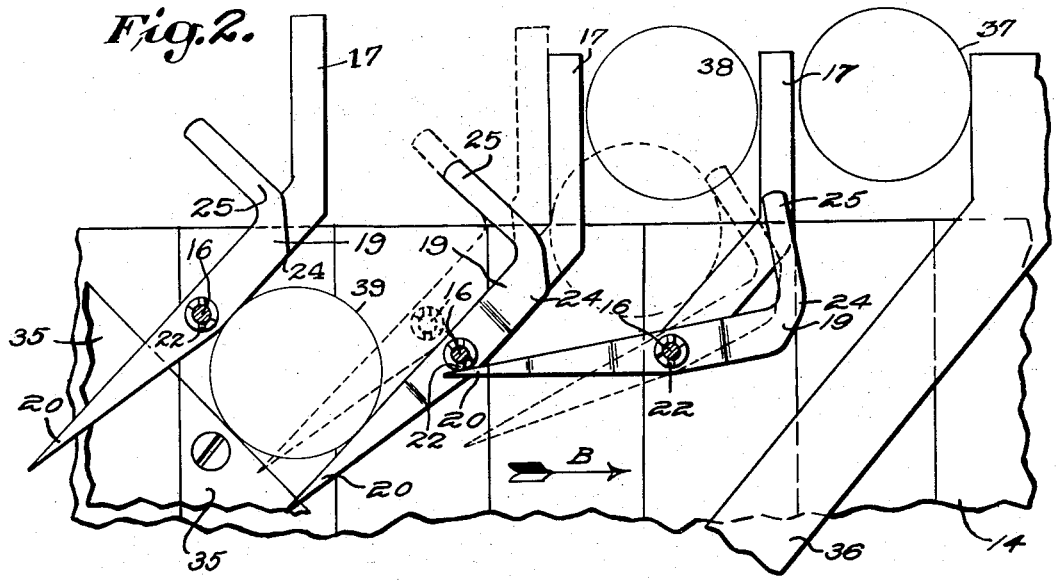
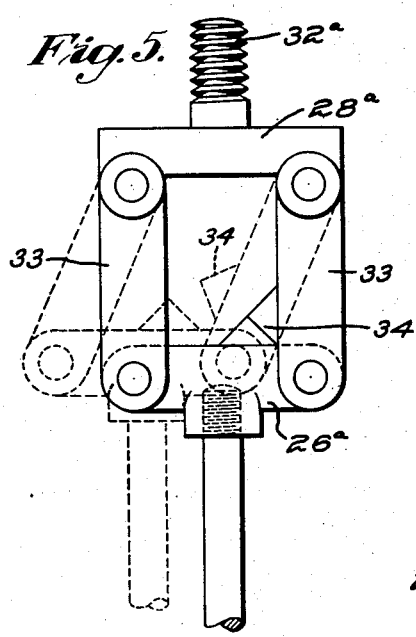
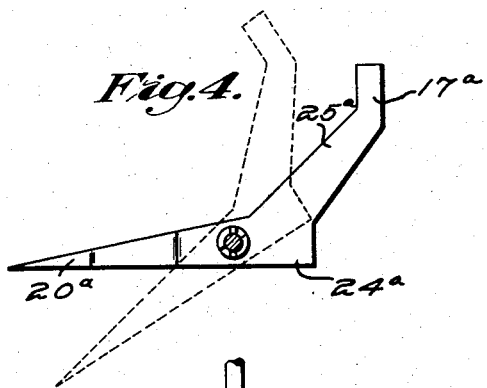
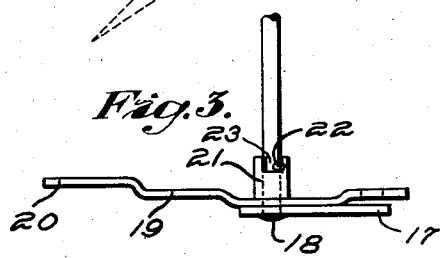
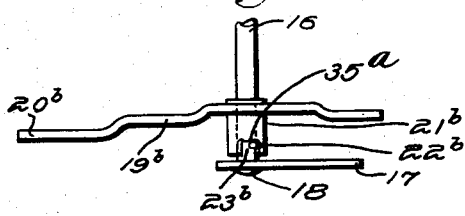
Witness.
Winslow B. Thayer
Inventor;
John E. Schroder
by Robson D Brown
Attorney Patented Dec. 8, 1931

1,835,814

UNITED STATES PATENT OFFICE

JOHN E. SCHRODER, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR DISTRIBUTING GLASSWARE

Application filed May 31, 1928. Serial No. 281,635.

This invention relates to apparatus for transferring glassware from a buck directly to a conveyor belt, and more specifically it relates to stackers for putting glass articles into position on the conveyor belt of a lehr.

It is the usual practice in glassware annealing to convey the articles to be annealed along the buck in a single row at a relatively high speed, while the ware on the conveyor belt is disposed in a plurality of rows which are moving at a relatively low speed. Prior devices for transferring ware from a buck to a lehr have usually operated in one or two ways. One method is to use a pusher or pusher bar which periodically pushes all the articles then on a certain portion of the buck laterally from the buck onto the conveyor belt of the lehr. This leaves the ware spaced transversely of the conveyor the same distance apart the ware was originally spaced longitudinally of the buck. In general this spacing is not as close as is desirable for the lehr and is not uniform. Another method of transferring the ware is to use a movable deflector or plow which travels along the buck in an opposite direction to that of the moving ware and pushes the articles successively in a lateral direction onto the conveyor belt. Such a plow may also be moved in the same direction as the ware on the buck but at a slower speed. In either case the speed of the plow is so chosen that the successive articles are brought nearer together in passing from the buck to the lehr and the spacing is thus made more nearly as desired. The last described method has the advantage of spacing the ware closer together on the lehr than it was on the buck but it still has the disadvantage that if the articles are not spaced uniformly longitudinally of the buck they will be spaced non-uniformly on the conveyor belt even though they are nearer together. Furthermore, the above described devices of the prior art. as well as many other such devices not described herein, generally lack any ready means of adjustability.

It has also been suggested to transfer bottles by a pivoted arm which lifts them bodily from a buck and deposits them on a conveyor belt. Transfer devices of this type are shown in the U. S. patent application, Serial No. 121,750, filed July 12, 1926, and in the patent application, Serial No. 204,875, filed July 11, 1927. As will clearly appear, such devices differ both structurally and functionally from the invention described herein.

It is one of the objects of the present invention to provide a method of and apparatus for transferring glassware from a single moving row to a plurality of moving rows spaced apart a predetermined distance, irrespective of the spacing of the glassware in the single row.

A further object of the invention is to provide simple, reliable and inexpensive apparatus of the character described which will function efficiently under various conditions of service, is not likely to get out of adjustment, and which will require little or no maintenance expense.

A further object of the invention is to provide ready and simple adjustability in the apparatus for transferring the glassware, whereby the transverse spacing of the ware on the conveyor belt of the lehr may be altered to accommodate ware of different sizes.

These and other objects will more fully appear from the following description and a consideration of the accompanying drawings, showing one embodiment of the invention and in which:—

Fig. 2 is an enlarged fragmentary plan view of certain of the deflectors and a portion of the buck;

Fig. 3 is an enlarged elevation of a deflector and its supporting rod;

Fig. 4 is a plan view of a modified form of a deflector;

Fig. 5 is an enlarged elevation of a modified form of the construction at the upper end of the rod supporting the deflector; and Fig. 6 is an enlarged elevation of a modified form of deflector and its supporting rod.

Figure 1:
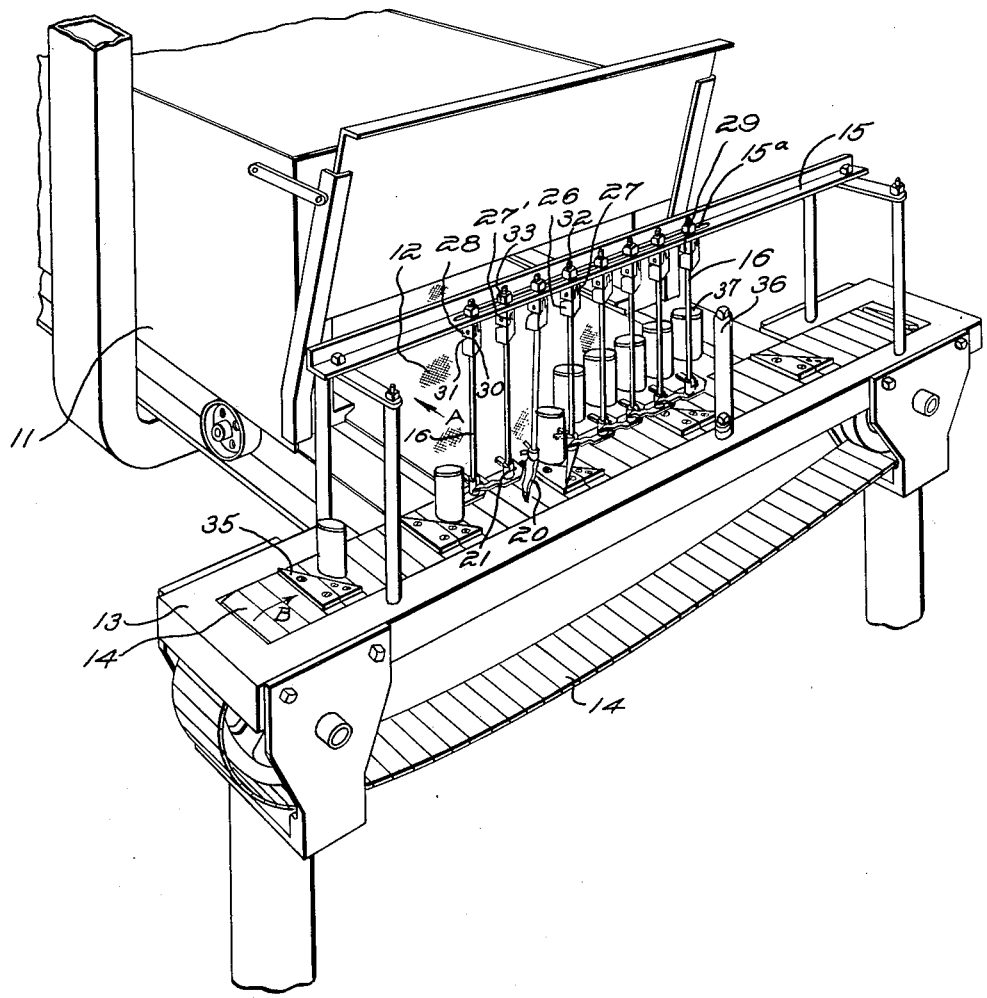
Figure 1 is a perspective view of a lehr and a buck as used with a stacker embodying the structural features of the invention.

Referring to the drawings in detail, 11 represents a tunnel lehr having the usual conveyor belt 12 moving in the directon indicated by the arrow A. A buck 13 is shown with its belt 14 traveling in the direction indicated by the arrow B. The buck 13 may be placed adjacent to the conveyor belt of the lehr where the belt passes upward around the pulley (not shown) at the receiving end of the lehr, the longitudinal edge of the belt 14 being disposed transversely of the conveyor belt.

A supporting frame 15 may be attached to the buck and is provided with a slot 15a for the reception of a plurality of switching devices. Each switching device comprises a supporting member or rod 16 which is disposed substantially vertically and carries at its lower end a switch. The construction of this lower portion or switch may be best seen in Figs. 2 and 3. A guiding member 17 is fixed to the rod 16 in any suitable manner, as by swaging the rod 16 at the lower end 18 thereof. A deflecting member or deflector 19 is rotatably mounted on the rod 16 and and may comprise an arm 20 rigidly fixed to a sleeve 21. The rotation of the deflector 19 is limited to an oscillating movement by a pin 22 extending transversely through the rod 16. This pin cooperates with the walls of notched recesses 23 in the sleeve 21. The deflector 19 may be provided with an extension integral with the arm 20 and extending from the sleeve 21 in an opposite direction from the arm 20. This extension has a shoulder 24 and a lateral portion 25. The extreme positions of the deflector 19 are indicated in Fig. 2, the middle switch being shown in its ware deflecting position and the right hand switch in its non-deflecting position.

The upper end of the rod 16 may be directly secured in the slot 15a of the frame 15 by any suitable means which permits its position to be changed along said slot but preferably a pivotal or hinged connection is provided between the upper end of the rod 16 and the slotted frame 15. Such a connection permits a closer stacking or spacing of the bottles upon the lehr conveyor. One way of obtaining such a connection is to secure a block 26 to the upper end of each rod.

A tongue 27 extends upwardly from each block into a slot 27' in a head 28. Pins 29 pivotally connect the blocks 26 to the heads 28. By providing the block with a square shoulder at 30 and a rounded shoulder at 31, the block together with the rod 16 is permitted to swing in a direction toward the left and toward the lehr but is prevented from swinging beyond a vertical position in the opposite direction. Thus the rod 16 carrying the switch that actually causes the change of direction of an article is maintained in its guiding position while the rod next to the left, as shown in Fig. 1, may yield, as the article approaches the line of the switch pivots, and thus permits an article of the full width of the space between adjacent fixed guiding members 17 to pass between its switch and the pivot of the adjacent switch. Suitable means may be provided for clamping the heads 28 at any predetermined position along the slot 15a. As shown studs 32 are rigidly fixed to the heads 28 and extend through the slot 15a and are held in place by nuts 33.

In Fig. 4 is shown a modified form of the switch. The stationary guiding member 17 and the deflector 19 are combined in one piece. An arm 20a corresponds to the arm 20, a shoulder 24a to the shoulder 24, and a lateral portion 25a to the lateral portion 25. In the previously described arrangement shown in Fig. 2 the fixed guiding member 17 is operative to guide ware only when the member 20 of the associate switch has completed a ware deflecting movement and has returned to its non-deflecting position as shown in full lines for the right hand switch in Fig. 2. In the modification of Fig. 4, the full line position of the portion 17a corresponds to the position of the member 17 in Fig. 2 and the portion 17a therefore operates like 17 when in such position.

Fig. 5 shows a modified form of the joint at the upper end of rod 16. The lower block 26 is replaced by the cross-piece 26a and the head 28 is replaced by a cross-head 28a to which the stud 32a is attached. Cross-piece 26a and cross-head 28a are connected by links 33 which are pivotally connected at their lower and upper ends to the lower cross-piece 26a and the upper cross-head 28a, respectively. At least one of the members 33 is provided with a shoulder 34 which cooperates with a complementary shoulder on cross-head 26a and prevents the cross-piece 26a and the rod 16 from swinging toward the right beyond the middle position while permitting swinging movement in the opposite direction. This modification permits the rod 16 to move to the left while still remaining vertical as distinguished from the construction shown in Fig. 1 where the lower end of the rod 16 may swing to the left, but because of the pivotal connection at the upper end the rod, when so moved, is inclined and not vertical.

Cleats 35 may be fastened to the belt of the buck to move the ware positively instead of relying on the friction between the belt and the ware. The forward edges of these cleats which push against the bottles are disposed diagonally across the belt.

A fixed deflector or guide 36 may be provided at the extreme right of the movable deflectors or switches to guide the first or right-hand article of each series onto the lehr conveyor and to cause that article to set the right-hand switch in deflecting position.

In Fig. 6 is shown a modified form of deflector represented generally by the reference numeral 19b. An arm 20b is secured to a sleeve 21b which has a slot 23b in the lower portion thereof. A pin 22b passes transversely through the rod 16 and extends into the slot, thus serving to limit the rotational or oscillating movement of the sleeve in the same way as in Fig. 3. In Fig. 6, however, the sleeve is supported by the pin 22b instead of by the member 17. The portion 35a of the sleeve which rests on the pin may be curved so that the sleeve slips down a little lower in either extreme position and it is necessary to raise the sleeve slightly in the middle position to pass over the pin. This arrangement tends to keep the sleeve in one extreme position or the other and prevents slight jars from moving it out of such positions although it is readily moved over the pin at the proper time in its cycle of operation.

In operation the switches are adjusted by means of the studs 32 and the nuts 33 in proper spaced relation to adapt them for the particular ware to be transferred from the buck to the conveyor belt. The portions 17 of adjacent switches then define guiding channels for the passage of the ware onto the belt of the lehr. The bottles or like articles of glassware pass along the buck toward the right as indicated by the arrow B. Provided none of the movable deflectors or switches are in the deflecting position, the first article of a series will continue its movement until it reaches the fixed deflector 36. It will then be guided diagonally by the deflector 36 until it passes off the belt of the buck onto the lehr conveyor and from then on it will travel with the lehr conveyor and in a direction substantially perpendicular to its former movement on the buck. The bottle 37 (Fig. 2) is shown as having left the buck and as having traveled a short distance on the lehr conveyor. In passing between the guide 36 and the adjacent deflector 19, the bottle 37 strikes the projection 24 and turns the arm 20 into the deflecting position across the path of the oncoming ware. In Fig. 2 the middle switch is shown in such a position. Bottle 38, being obstructed by the diagonal barrier or deflector 19, is guided onto the belt of the lehr conveyor. In passing from the buck to the lehr, the bottle 38 strikes the lateral portion 25 of the deflector and returns the switch, which has just deflected the bottle 38, to its non-deflecting position. An intermediate position of the right-hand switch during this switching and restoring operation is shown in dotted lines and the final non-deflecting position of the same switch is shown in full lines in Fig. 2. In passing diagonally across the buck the bottle 38 strikes the shoulder 24 of the middle switch and turns it into deflecting position as shown in Fig. 2. Bottle 39 in turn is deflected and is shown beginning to turn the next switch into deflecting position by striking against its shoulder 24.

When the last movable deflector has diverted a bottle from the buck to the lehr and the bottle has restored its deflector to its non-deflecting position, the path along the buck will be unobstructed for the next bottle to pass clear across to the right, strike the fixed deflector 36 and start another series of operations. It will be noted that the bottle 37 has traveled a little further along the lehr than the bottle 38 and that the bottle 38 has traveled a little further along than bottle 39. By the time that all the switch stations have received and deflected bottles onto the lehr, the first bottle, 37, will have traveled a sufficient distance on the lehr so that the next bottle which is deflected through the same station will be sufficiently spaced from the previous bottle 37 to prevent their touching each other.

The joint at the top of the rod 16 permits the rod to swing slightly to the left and toward the lehr, and thus permits the passage of an article of substantially the width of the space between the guides 17 when the rods are in their normal perpendicular position, past the bottom of a particular swinging guide and the guide adjacent thereto at the right, and thus permits a close stacking of the articles upon the lehr conveyor. The joint also permits the passage between adjacent rods of articles which may be somewhat over-sized and thus prevents any tendency for the articles to become jammed even though they are somewhat non-uniform.

By reason of the adjustability of the rods 16 along the slot 15a, the spacing between adjacent stations may be changed to accommodate ware of different sizes. This not only provides desirable flexibility, but the adjustments are also very simple and changes may be made very quickly.

It is to be understood that the above embodiments of the invention are for the purpose of illustration only and various changes may be made therein without departing from the spirit and scope of the invention as defined in the appended claims.

I claim:

1. An automatic stacker for glassware, comprising a plurality of deflectors, each deflector being movable into a deflecting position and a non-deflecting position, means associated with each deflector for moving it from deflecting to non-deflecting position by the passage of the glassware diverted by said deflector in its deflecting position, and means associated with each deflector and operable by the passage of the ware through the deflected path controlled by the preceding deflector for moving it into its deflecting position.

2. In glassware handling apparatus, a lehr conveyor, a buck disposed substantially at right angles to said lehr conveyor, a plurality of guiding channels for guiding glass articles laterally from said buck and longitudinally onto said conveyor, a deflector for each channel for directing said articles into said channels, means associated with each deflector for moving it into a ware deflecting position by the passage of an article through the preceding channel and means associated with each deflector for moving it out of ware deflecting position by the passage of an article through its own channel.

3. An automatic stacker for controlling the discharge of glassware laterally from a buck, comprising a plurality of switches adjustable to different positions longitudinally of said buck, each switch comprising a deflector movable into its deflecting position by the passage of an article diverted by the previous deflector and movable into its non-deflecting position by the passage of an article diverted by the first named deflector.

4. In glassware handling apparatus, a lehr conveyor, a buck disposed with its line of travel substantially at right angles to the line of travel of said conveyor, a fixed deflector for diverting an article of glassware laterally of said buck to said conveyor, a plurality of movable deflectors for discharging subsequent articles of glassware from different places longitudinally of said buck to different paths transversely of said conveyor, said movable deflectors being successively operated by the passage of the glassware through the deflected paths.

5. Apparatus for transferring articles from a conveyor on which they are moving in a single row onto a second conveyor in a plurality of rows, comprising a plurality of channels for transferring the articles laterally from said first named conveyor, a plurality of deflectors for controlling the discharge of said articles into said channels, the passage of an article through one of said channels operating to move the deflector of its own channel to its non-deflecting position and to move the deflector of the adjacent channel to its deflecting position.

6. A device for transferring glassware, comprising a stationary deflector, a plurality of movable deflectors, means associated with each movable deflector operated by the passage of ware along the preceding path of deflection of the ware for moving such deflector into its deflecting position, and means associated with each movable deflector operated by the passage of ware along the path adjacent to the deflector when it is in deflecting position for moving such deflector to its non-deflecting position.

7. An automatic stacker for glassware, comprising a plurality of switching devices, each switching device being independently adjustable in position to a predetermined switching station and each switching device having ware deflecting means movable into deflecting and non-deflecting positions, each deflecting means being adapted to be moved into its deflecting position by one article of glassware and into its non-deflecting position by another article of glassware.

8. In glassware handling apparatus, a lehr conveyor, a buck disposed substantially at right angles to and across the receiving end of said lehr conveyor, a switch for automatically stacking glassware upon said lehr belt, said switch comprising a deflector, means associated with said deflector for moving it into its deflecting position by the passage of glassware adjacent thereto, and means associated with said deflector for returning it to its non-deflecting position by the passage of the glassware diverted by said deflector.

9. A glassware handling device in combination with a lehr conveyor and a buck disposed adjacent to the said conveyor and at an angle thereto, a stacking device comprising a plurality of deflectors, each of said deflectors comprising a substantially vertical supporting member mounted on a horizontal pivot for limited movement upon the presentation to the deflector of oversized articles of glassware, and a finger mounted on said supporting member for oscillation about the axis of said member in response to contact of glassware therewith, the several deflectors being mounted in selected spaced relation such that articles of glassware of selected size may be closely stacked upon the lehr conveyor.

10. In glassware handling apparatus, a lehr conveyor, a buck disposed adjacent to said lehr conveyor, an automatic stacker for controlling the discharge of glassware from the buck to the conveyor comprising a plurality of deflectors, each deflector comprising a vertically disposed supporting member, a cross piece at the upper end of said member, a cross head, a pair of parallel links pivotally connecting said cross piece and said cross head, and means for preventing said supporting member from swinging in one direction beyond a given position.

11. In a switching device for an automatic stacker, a deflector movable into a deflecting position and a non-deflecting position, stops for limiting the motion as said deflector is moved into either of said positions, means operable by the objects stacked for moving said deflector to said positions alternately, and means for holding said deflector in either position against slight displacing forces.

12. In a switching device for automatic stackers, a vertically disposed supporting member, a sleeve rotatively carried by said member, a deflector rigidly fixed to said sleeve, a pin extending transversely of said supporting member, said sleeve being supported by said pin and having stops for limiting the rotation of said sleeve in both directions, the portion of said sleeve supported by said pin being formed to prevent displacement under the action of relatively slight rotative forces.

13. A device for deflecting articles of glassware from a moving conveyor to a second moving conveyor adjacent to the first conveyor, comprising a fixed deflector and a series of other deflectors, each movable between a ware deflecting and a non-deflecting position, said fixed deflector and each movable deflector when in its deflecting position being adapted to deflect an article of glassware from the first conveyor to the second conveyor in such manner as to move the succeeding movable deflector from its non-deflecting position to its ware deflecting position, and each movable deflecting member so moved being adapted to be returned to its non-deflecting position by reason of its own ware deflecting operation.

14. In glassware handling apparatus, a lehr conveyor, a buck disposed adjacent to said lehr conveyor, a deflector for diverting glassware articles laterally from said buck and longitudinally onto said conveyor, said deflector being movable into a ware deflecting position and out of a ware deflecting position, means associated with said deflector for moving it into a ware deflecting position, said means being actuated by the passage of an article through a path adjacent to said deflector, and means associated with said deflector for moving it out of ware deflecting position, said means being actuated by the passage of an article through the path controlled by said deflector.

15. In glassware handling apparatus, a lehr conveyor, a buck disposed adjacent to said lehr conveyor, a plurality of deflectors for automatically stacking articles of glass upon said lehr conveyor, each deflector being movable into deflecting position and into a non-deflecting position, means associated with each deflector for moving it from deflecting to non-deflecting position by the passage of glassware diverted by said deflector in its deflecting position, and means associated with each deflector for moving it into its deflecting position.

16. Glassware handling apparatus, a lehr conveyor, a buck disposed adjacent to said lehr conveyor, a plurality of deflectors for automatically stacking glassware upon said lehr conveyor, each deflector being movable into a deflecting position and into a non-deflecting position, means associated with each deflector and operable by the passage of ware through the path controlled by the preceding deflector for moving the deflector into its deflecting position and means associated with each deflector for moving said deflector from deflecting to non-deflecting position.

17. In glassware handling apparatus, a lehr conveyor, a buck disposed adjacent to and substantially at right angles to said lehr conveyor, and a plurality of deflectors for diverting glassware from the buck and for automatically stacking said glassware upon said lehr conveyor, said deflectors being movable and operated by the passage of glassware being stacked.

18. In glassware handling apparatus, a lehr conveyor, a buck disposed adjacent to said lehr conveyor, a fixed deflector for diverting an article of glassware laterally of said buck from said buck to said conveyor, a plurality of movable deflectors for similarly diverting subsequent articles of glassware from different places longitudinally of said buck to different paths transversely of said conveyor, said movable deflectors being successively operated by the passage of glassware through the deflected paths.

19. Apparatus for transferring articles of glassware from a conveyor to a second conveyor placed at an angle thereto, comprising a plurality of deflectors, each having a member movable between a position transverse of the first conveyor and a position parallel thereto, and means actuated by said articles to move said member to each of said positions.

20. In glassware handling apparatus, a lehr conveyor, a buck disposed with its line of travel at an angle to the line of travel of the lehr conveyor, a plurality of cleats on said buck, a fixed deflector cooperating with said cleats for diverting an article of glassware from the buck to the conveyor, and a plurality of movable deflectors cooperating with said cleats for diverting subsequent articles of glassware from said buck to said conveyor.

Signed at Hartford, Conn., this 28th day of May, 1928.

JOHN E. SCHRODER.